(12) United States Patent
Landphair et al.

(10) Patent No.: US 11,665,990 B2
(45) Date of Patent: Jun. 6, 2023

(54) WORK VEHICLE WITH GROUND SUPPORT UNIT HAVING NON-TREADED AREA ALIGNED WITH ROW UNIT COMPONENT

(71) Applicant: DEERE & COMPANY, Moline, IL (US)

(72) Inventors: Donald K. Landphair, Moline, IL (US); Nathan A. Mariman, Davenport, IA (US)

(73) Assignee: DEERE & COMPANY, Moline, IL (US)

( * ) Notice: Subject to any disclaimer, the term of this patent is extended or adjusted under 35 U.S.C. 154(b) by 801 days.

(21) Appl. No.: 16/057,407

(22) Filed: Aug. 7, 2018

(65) Prior Publication Data

US 2020/0045872 A1  Feb. 13, 2020

(51) Int. Cl.
*A01B 76/00* (2006.01)
*A01C 5/06* (2006.01)

(52) U.S. Cl.
CPC .............. *A01B 76/00* (2013.01); *A01C 5/064* (2013.01); *A01C 5/068* (2013.01)

(58) Field of Classification Search
CPC ......... A01C 7/208; A01C 5/064; A01C 5/068; A01B 76/00
USPC ................ D12/502, 507–511, 512, 544, 579
See application file for complete search history.

(56) References Cited

U.S. PATENT DOCUMENTS

| | | | | |
|---|---|---|---|---|
| D58,181 S | * | 6/1921 | Dickinson | D12/569 |
| 1,522,448 A | * | 1/1925 | Harig | B60C 11/0316 152/209.12 |
| 2,130,524 A | * | 9/1938 | Clark | B60C 11/18 152/209.5 |
| 3,037,469 A | * | 6/1962 | Watson et al. | A01C 7/006 111/52 |
| 3,372,657 A | * | 3/1968 | Hansen | A01B 49/04 111/180 |
| D213,752 S | * | 4/1969 | Hawkinson | D12/591 |

(Continued)

OTHER PUBLICATIONS

Shamrock Tire, "Advance Tires in Wichita, KS," Captured on Aug. 17, 2016, Retrieved on Mar. 22, 2021, available at <https://web.archive.org/web/20160817192213/https://shamrock-tire.com/advance-tires-wichita-ks>. (Year: 2016).*

(Continued)

*Primary Examiner* — Thomas B Will
*Assistant Examiner* — Joel F. Mitchell
(74) *Attorney, Agent, or Firm* — Klintworth & Rozenblat IP LLP (57) ABSTRACT

A work vehicle includes a frame and a row unit that is attached to the frame. The row unit includes a gauge wheel and a ground engaging implement. The gauge wheel is configured to ride on the ground surface and maintain the ground engaging implement at a predetermined vertical position with respect to the ground surface. Furthermore, the work vehicle includes a ground support unit that supports the frame for movement across the ground surface. The ground support unit includes an outer face. The outer face includes a non-treaded side area that defines a lateral side of the outer face. The outer face includes a tread area that is spaced laterally from the lateral edge. The tread area includes a plurality of projections. The non-treaded side area is aligned along the travel direction with respect to the gauge wheel.

20 Claims, 2 Drawing Sheets

(56) References Cited

U.S. PATENT DOCUMENTS

| | | | | |
|---|---|---|---|---|
| 4,186,788 | A * | 2/1980 | Pommier | B60C 11/0316 152/209.12 |
| 4,416,317 | A * | 11/1983 | Caretta | B60C 11/0306 152/209.1 |
| 5,097,882 | A * | 3/1992 | Adam et al. | B60C 11/04 152/209.18 |
| D460,403 | S * | 7/2002 | Buresh et al. | D12/567 |
| D482,319 | S * | 11/2003 | Nishimori | D12/536 |
| D505,655 | S * | 5/2005 | Rossignaud | D12/536 |
| 7,231,948 | B2 * | 6/2007 | Forney et al. | B29C 39/08 152/310 |
| 8,281,831 | B2 * | 10/2012 | Lo | B60C 11/0316 152/209.8 |
| 8,428,831 | B2 * | 4/2013 | Thompson et al. | A01B 69/004 701/50 |
| 8,700,269 | B2 * | 4/2014 | Hubalek | A01B 69/006 701/50 |
| 9,096,264 | B2 * | 8/2015 | Connors et al. | A01B 69/003 |
| 9,150,055 | B2 * | 10/2015 | Mariani et al. | B60C 11/0332 |
| D766,164 | S * | 9/2016 | Chen | D12/544 |
| 9,699,949 | B2 * | 7/2017 | Lykken et al. | A01B 51/04 |
| 9,789,735 | B2 * | 10/2017 | Schiavolin et al. | B60C 11/033 |
| 2012/0232760 | A1 | 9/2012 | Hubaiek | |
| 2014/0262378 | A1 | 9/2014 | Connors et al. | |
| 2015/0223385 | A1 | 8/2015 | Lykken et al. | |
| 2016/0050837 | A1 * | 2/2016 | Schaffert et al. | A01B 29/04 172/540 |

OTHER PUBLICATIONS

Firestone, Duo Rib Planter Tire, available at https://commercial.firestone.com/en/agriculture/product/duo-rib, Copyright 2018.

The Western Producer, "Gramlow tacks rubber tracks and GPS onto planter," published Jan. 20, 2015, available at www.producer.com/2015/01/gramlow-tacks-rubber-tracks-and-gps-onto-planter/. Copyright 2018.

M.e. Miller tire, 255/70R22.5 Kinze Planter Tire, available at http://www.millertire.com/products/implement-tires/255-70r22-5/255-70r22-5-kinze-planter-tire/, Copyright 2018.

European Search Report issued in counterpart European Patent. Application No. 19182401.0 dated Jan. 8, 2020 (6 pages).

* cited by examiner

WORK VEHICLE WITH GROUND SUPPORT UNIT HAVING NON-TREADED AREA ALIGNED WITH ROW UNIT COMPONENT

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to work vehicles, such as planters and seeders, and, more particularly, relates to a work vehicle with a ground support unit, such as a continuous track, having a non-treaded area that is aligned with one or more ground-engaging components of a row unit for improved planting operations.

BACKGROUND OF THE DISCLOSURE

Some work vehicles are configured for applying seed, fertilizer, and/or other particulate commodities to a field. Oftentimes, the work vehicle may include a metering system, which meters out a predetermined amount of the commodity for delivery to the soil. The work vehicle may also include a plurality of row units with ground engaging components used to plant the commodity within the soil.

More specifically, as the work vehicle moves across the field, ground engaging implement(s) of a row unit may create a trench or furrow in the soil. The row unit may deliver the commodity into the trench. Then, the ground engaging implement(s) may move the soil over the commodity and bury the commodity under the surface of the soil. Other ground-engaging components of the row unit may maintain the other implements at a predetermined depth relative to the ground surface.

SUMMARY OF THE DISCLOSURE

This disclosure provides a work vehicle with an improved ground support unit for supporting the vehicle for movement across the field, wherein the support unit causes relatively little disturbance to the soil, mud, or other ground material ahead of one or more components of a row unit.

In one aspect, the disclosure provides a work vehicle that is configured to travel in a travel direction across a ground surface. The work vehicle includes a frame and a row unit that is attached to the frame. The row unit includes a gauge wheel and a ground engaging implement. The gauge wheel is configured to ride on the ground surface and maintain the ground engaging implement at a predetermined vertical position with respect to the ground surface. Furthermore, the work vehicle includes a ground support unit that supports the frame for movement across the ground surface. The ground support unit includes an outer face. The outer face includes a non-treaded side area that defines a lateral side of the outer face. The outer face includes a tread area that is spaced laterally from the lateral edge. The tread area includes a plurality of projections. The non-treaded side area is aligned along the travel direction with respect to the gauge wheel.

In another aspect, the disclosure provides a work vehicle configured to travel in a travel direction across a ground surface. The work vehicle includes a commodity tank configured to contain a commodity. The work vehicle also includes a frame that supports the commodity tank. Furthermore, the work vehicle includes a delivery system supported by the frame and configured to convey commodity from the commodity tank away from the work vehicle. Moreover, the work vehicle includes a row unit attached to the frame and including a gauge wheel and a ground engaging implement. The gauge wheel is configured to ride on the ground surface and maintain the ground engaging implement at a predetermined vertical position with respect to the ground surface. The work vehicle includes a ground support unit that supports the frame for movement across the ground surface. The ground support unit includes an outer face. The outer face includes a non-treaded side area that defines a lateral side of the outer face. The outer face includes a tread area that is spaced laterally from the lateral edge. The tread area includes a plurality of projections. The non-treaded side area is aligned along the travel direction with respect to the gauge wheel.

In a further aspect, the disclosure provides a work vehicle configured to travel in a travel direction across a ground surface. The work vehicle includes a frame and a plurality of row units that are attached to the frame. The plurality of row units include a first row unit and a second row unit. The first row unit neighbors the second row unit with an intermediate space defined laterally between the first and second row units. The first row unit includes a first gauge wheel and a first ground engaging implement. The second row unit includes a second gauge wheel and a second ground engaging implement. Furthermore, the work vehicle includes a ground support unit that supports the frame for movement across the ground surface. The vehicle support includes a continuous tread. The continuous tread includes a first non-treaded side area that defines a first lateral side of the continuous tread, a second non-treaded side area that defines a second lateral side of the continuous tread, and a tread area that is defined between the first and second non-treaded side areas. The tread area includes a plurality of treads. The first non-treaded side area is aligned along the travel direction with respect to the first gauge wheel and the first ground engaging implement. The second non-treaded side area is aligned along the travel direction with respect to the second gauge wheel and the second ground engaging implement. The tread intermediate area is aligned along the travel direction with respect to the intermediate space.

The details of one or more embodiments are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

The following describes one or more example embodiments of a work vehicle with a ground support unit, such as a continuous track. The continuous track may include a non-treaded portion and a treaded portion that are aligned with respect to one or more row unit components to improve planting operations as shown in the accompanying figures of the drawings described briefly above. Various modifications to the example embodiments may be contemplated by one of skill in the art.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

Furthermore, in detailing the disclosure, terms of direction, such as "forward," "rear," "front," "back," "lateral," "horizontal," and "vertical" may be used. Such terms are defined, at least in part, with respect to the direction in which the work vehicle or implement travels during use. The term "forward" and the abbreviated term "fore" (and any derivatives and variations) refer to a direction corresponding to the direction of travel of the work vehicle, while the term "aft" (and derivatives and variations) refer to an opposing direction.

The following describes one or more example implementations of the disclosed work vehicle, as shown in the accompanying figures of the drawings described briefly above. Generally, the work vehicle includes one or more ground support units, such as a continuous track, a wheel, a sled, or other similar component that support the weight of the work vehicle as well as facilitate movement of the work vehicle across a field.

In some embodiments, the support unit may be a continuous track that runs in a continuous loop in a travel direction between the front and back of the vehicle. The track may include an outer lateral edge and an inner lateral edge. The track may include a tread pattern arranged between the outer lateral edge and the inner lateral edge. In some embodiments, the tread pattern may include at least one non-treaded portion and a rough portion. The non-treaded portion may define one of the outer lateral edge and the inner lateral edge. The rough portion may be spaced apart at a distance away from the one of the outer lateral edge and the inner lateral edge. In some embodiments, the tread pattern may include a first non-treaded portion that defines the inner lateral edge and a second non-treaded portion that defines the outer lateral edge; additionally, the tread portion may include a rough portion with a plurality of projections (e.g., bar-shaped treads) that are arranged between the first non-treaded portion and the second non-treaded portion.

The non-treaded portion(s) may be aligned longitudinally with one or more components of a row unit that are trailing behind during vehicle travel. For example, the row unit may include a gauge wheel, which regulates and maintains one or more ground engaging implements at a set height relative to the ground surface. A non-treaded portion of the continuous track may be aligned longitudinally with the gauge wheel. Accordingly, the gauge wheel is likely to encounter smooth ground as the vehicle travels. The gauge wheel is less likely to bounce vertically or vibrate during travel. The gauge wheel is thereby better able to maintain the ground engaging implements at the set height such that the row unit is more likely to plant the commodity at the predetermined soil depth.

Furthermore, the non-treaded portion of the track may be aligned longitudinally with one or more ground engaging implements. For example, the non-treaded portion may be aligned with an opener implement (e.g., an opener disc or wheel) that is configured to open a furrow within the soil. Furthermore, the non-treaded portion may be aligned with a closer implement (e.g., a closer disc or wheel) that is configured to close the furrow once the commodity is deposited therein. The non-treaded portion of the track may be aligned such that the ground ahead of the implement(s) has relatively little compaction. The non-treaded portion is less likely to compact the soil, mud, or other ground material. As such, the opener implement and/or the closer implement is better able to move the ground material and ensure proper planting of the commodity.

Figure 1:
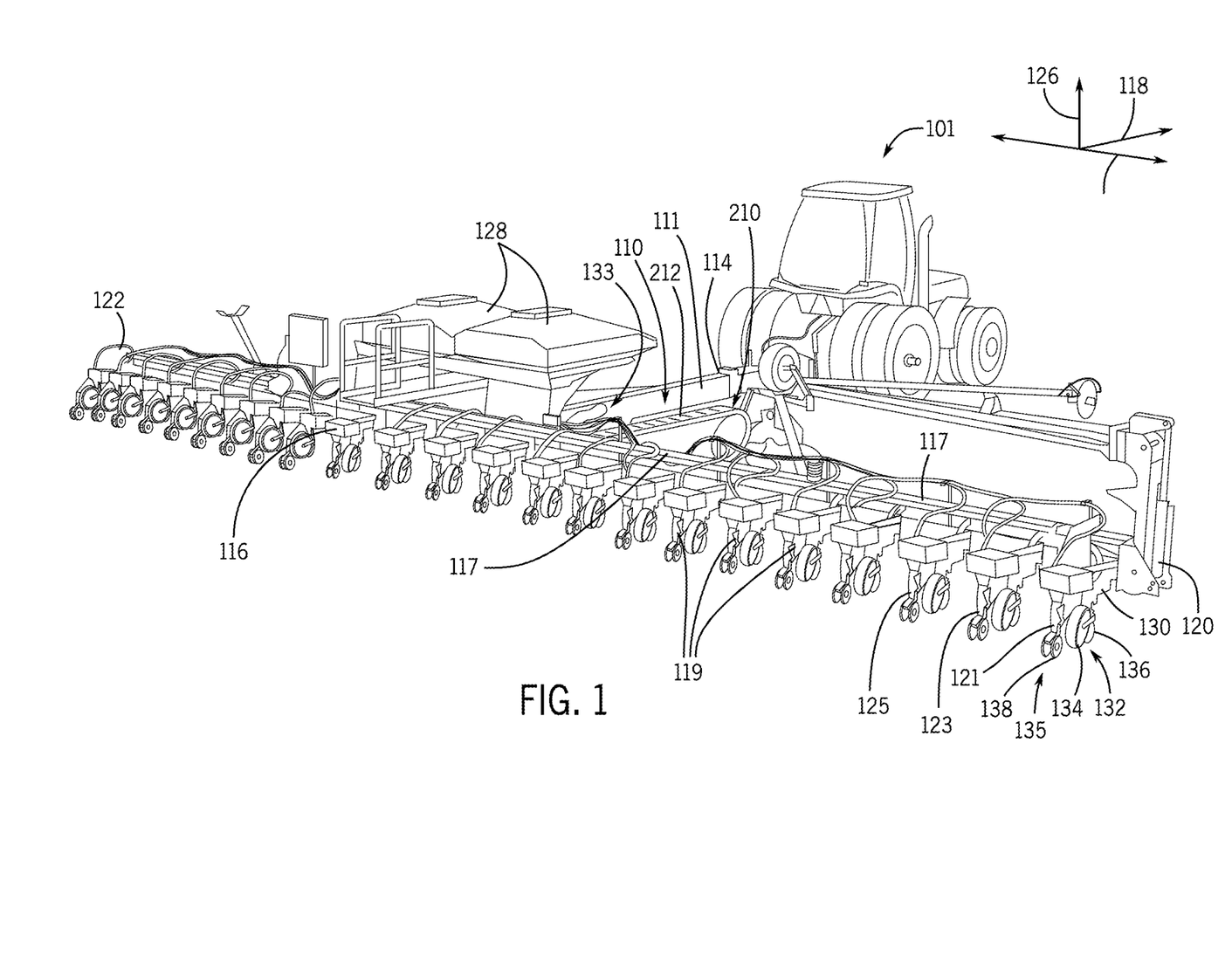
FIG. 1 is a rear perspective view of a towing work vehicle and a towed work vehicle with a plurality of row units according to example embodiments of the present disclosure.
Figure 2:
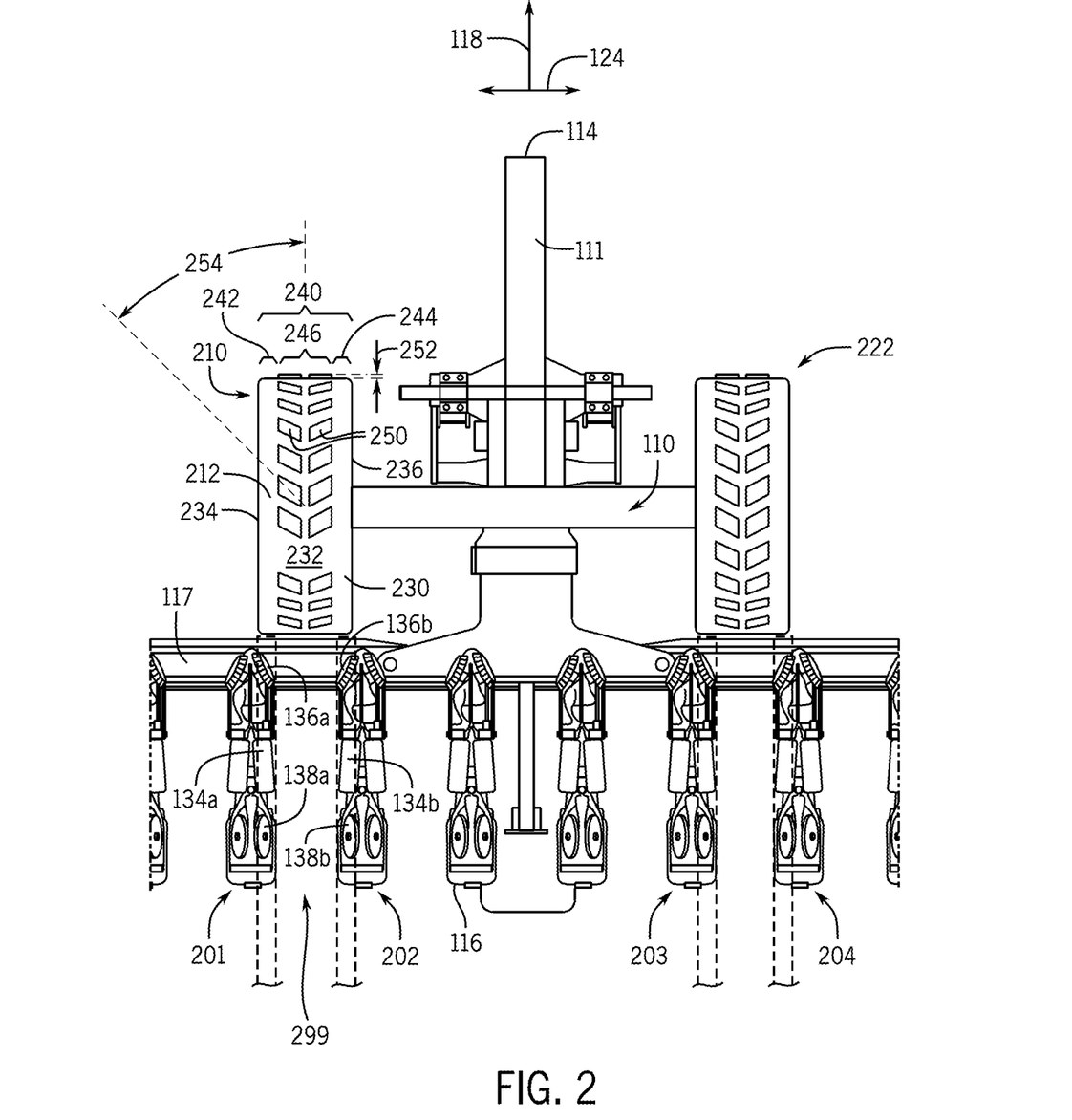
FIG. 2 is a bottom view of the work vehicle and the row units of FIG. 1 according to example embodiments.

FIGS. 1 and 2 illustrate a work vehicle 100 according to example embodiments of the present disclosure. In some embodiments, the work vehicle 100 may be a planter or seeder configured for agricultural work. It will be appreciated that the illustrated work vehicle 100 is an example embodiment. One or more features of the present disclosure may be included on a different work vehicle without departing from the scope of the present disclosure.

The work vehicle 100 may be towed by another vehicle, such as a tractor 101. Thus, the work vehicle 100 may be a towed work vehicle. In other embodiments, the work vehicle 100 of the present disclosure may be a self-propelled vehicle. For example, one or more features of the present disclosure may be applied to the tires of the tractor 101 shown in FIG. 1.

The work vehicle 100 includes a front end 114 and a rear end 116. The work vehicle 100 also includes a first side 120 and a second side 122. The work vehicle 100 defines a longitudinal axis 118, which may extend between the rear end 116 and the front end 114. It will be appreciated that the longitudinal axis 118 may correspond to a travel direction of the work vehicle 100. The work vehicle 100 further defines a lateral axis 124 extending between the first side 120 and the second side 122. Furthermore, the work vehicle 100 defines a vertical axis 126, which extends normal to the longitudinal axis 118 and the lateral axis 124.

The work vehicle 100 may include a frame structure 110 (i.e., a chassis). The frame structure 110 may include an elongate tongue 111. The tongue 111 may be a rigid or telescoping beam that extends along the longitudinal axis 118. The tongue 111 may include a towing package for hitching and unhitching from the tractor 101. The frame structure 110 may further include a lateral beam 117. The lateral beam 117 may be a rigid member that extends along the lateral axis 124. The lateral beam 117 may be fixed to the tongue 111 of the frame structure 110, proximate the rear end 116 of the work vehicle 100.

The work vehicle 100 may also include one or more commodity containers 128 that are supported on the frame structure 110. The commodity containers 128 may contain a bulk amount of a commodity (e.g., seed, fertilizer, etc.). The work vehicle 100 may further include a distribution system 133 with hoses, lines, etc. that are configured to distribute the commodity from the tank 131 to a plurality of row units 119. The commodity system 129 may also include a metering system that meters out the commodity at a predetermined rate.

The work vehicle 100 may additionally include at least one ground support unit 210 configured for supporting movement of the work vehicle 100 across a field. In some embodiments represented in FIGS. 1 and 2, the ground support unit 210 may be a continuous track 212. However, it will be appreciated that the ground support unit 210 may be a wheel, a sled, a fixed track, or other type of support without departing from the scope of the present disclosure. In the illustrated embodiment, the track 212 may be supported for continuous movement relative to the frame structure 110. The track 212 may run in a loop and may continuously travel along the longitudinal axis 118 as the work vehicle 100 moves. In some embodiments, the track 212 may be driven (e.g., by an electric motor, a hydraulic actuator, etc.) to propel the vehicle 100. In contrast, in other embodiments, the track 212 may move continuously due to the tractor 101 that is towing the work vehicle 100.

The row units 119 may be attached to the lateral beam 117 of the frame structure 110. The row units 119 may branch rearward from the lateral beam 117 to define much of the rear end 116 of the work vehicle 100. The plurality of row units 119 may be substantially similar to each other and may include a first row unit 121, a second row unit 123, a third row unit 125, and so on, across the rear end 116 and along the lateral axis 124. In some embodiments, the row units 119 may be configured to: 1) open a trench, furrow, or other ground opening as the work vehicle 100 moves through a field; 2) deposit seed, fertilizer, or other commodity within the opening; and 3) close the ground opening by moving soil and/or other materials back into the opening to thereby plant the commodity therein.

The first row unit 121 may be a representative example of the other row units 119. The first row unit 121 may include a row unit frame 130. The row unit frame 130 may include a plurality of strong and rigid brackets, linkages, fasteners, etc., that support other components that will be discussed. The row unit frame 130 may be attached to the frame structure 110. For example, the row unit frame 130 may be attached to the lateral beam 117 and may extend rearward therefrom.

The first row unit 121 may also include a ground system 132. The ground system 112 may include one or more gauge wheels 134 that are attached to the row unit frame 130. The ground system 132 may also include one or more ground engaging implements 135 that move soil (e.g., to create and close a trench as the vehicle 100 moves across the field). Specifically, in some embodiments, the ground engaging implements 135 may include one or more opener implements 136 (e.g., opener discs or wheels) and one or more closer implements 138 (i.e., closer discs or wheels). Generally, as the vehicle 100 travels across a field, the opener implements 136 may open a trench in the soil, seed may be deposited in the open trench, and the closer implements 138 may close the trench over the seed. Additionally, the gauge wheels 134 may ride on the surface of the ground as the vehicle 100 travels, maintaining a set vertical position of the ground engaging implements 135 relative to the ground surface. Thus, the gauge wheels 134 may maintain a set depth of the furrow created by the opener implements 136 and maintain a consistent depth for the commodity within the earth.

The commodity containers 128 may contain a substantial amount of the commodity. The one or more ground support units 210 may be configured for supporting this weight in a manner that promotes planting operations of the work vehicle 100 as represented in FIG. 2.

As shown in the bottom view of FIG. 2, the continuous track 212 may be a first continuous track 212. The work vehicle 100 may also include a second continuous track 222. The first and second continuous tracks 212, 222 may be disposed on opposite lateral sides of the frame structure 110, proximate and generally underneath the commodity tanks 128. The first and second continuous tracks 212, 222 may be disposed proximate the central longitudinal axis 118 of the work vehicle 100.

The first and second continuous tracks 212, 222 may include various features that effectively support the vehicle 100 for movement across the field. These features may limit compaction of the ground material as the vehicle 100 moves. These features may also maintain a smooth path, for example, for the gauge wheels 134 to traverse. Accordingly, these features enhance the effectiveness and efficiency of the row units 119.

In some embodiments, the first and second continuous tracks 212, 222 may be the only two ground support units 210 at this position along the axis 118 of the vehicle 100. Accordingly, distortion and/or compaction of the soil and other ground material with the work vehicle 100 may be minimized. Furthermore, the work vehicle 100 may be better equipped to travel over crowned roads, across a particular grade, etc.

The first and second continuous tracks 212, 222 may be substantially similar. The first continuous track 212 will be discussed in detail, and this description may apply to the second continuous track 222.

The first continuous track 212 may include a belt 230. The belt 230 may define an outer face 232 that alternatingly faces the ground and faces the sky as the vehicle 100 moves. The belt 230 may also define a first lateral side 234 (outer lateral side) and a second lateral side 236 (inner lateral side) that extend continuously on opposite sides of the belt 230. The first lateral side 234 may face outward away from the longitudinal axis 118 and the second lateral side 236 may face inward.

A width of the belt 230 measured from the first lateral side 234 to the second lateral side 236 may be approximately twenty four inches (24 in.) or larger. This may ensure sufficient soil contact area to reduce compaction to an acceptable level.

In some embodiments, the outer face 232 may include a tread surface 240 with a first non-treaded area 242, a second non-treaded area 244, and a tread area 246 that are spaced apart laterally from each other. The first non-treaded area 242 may define the first lateral side 234. The second non-treaded area 244 may define the second lateral side 236. The tread area 246 may be disposed between the first non-treaded area 242 and the second non-treaded area 244 along the lateral axis 124.

The tread area 246 may include a plurality of projections, such as bar treads 250 that project outwardly at a distance (i.e., a tread depth 252) from the surrounding areas of the outer face 232. The bar treads 250 may be disposed at a positive angle 254 relative to the longitudinal axis 118. There may be a first and second row of bar treads 250 arranged symmetrically within the tread area 246.

The first non-treaded area 242 and the second non-treaded area 244 may be substantially smooth. In other words, the first and second smooth areas 242, 244 may be a flush, even area of the outer face 232. There may be relatively small undulations or some degree of surface roughness in these areas 242, 244. There may even be small projections arranged on these areas 242, 244, however, the height of these projections may be significantly lower (e.g., lower by a factor of ten) than the tread depth 252 of the bar treads 250 of the tread area 246.

As the work vehicle 100 travels across the field, the first and second continuous tracks 212, 222 may distort (compress, squeeze, or otherwise move) the soil, mud, and other ground material to some degree. However, the effects may be minimized because the first and second continuous tracks 212, 222 are spaced outward laterally on the tread surface 240. The tracks 212, 222 may move the ground material outward laterally from the track 212, 222 instead of compacting downward. Also, the tread area 246 may provide traction in some embodiments and may create divots, tread marks, or other distortions. In contrast, the first non-treaded area 242 may leave the ground relatively smooth as it travels over. Likewise, the second non-treaded area 244 may leave the opposite side relatively smooth as well.

Furthermore, a fourth row unit 201, a fifth row unit 202, a sixth row unit 203, and a seventh row unit 204 are shown in the embodiment of FIG. 2. These row units 201-204 may be substantially similar to the row units 119 discussed above with respect to FIG. 1. The fourth and fifth row units 201, 202 may trail immediately behind the first continuous track 212. The sixth and seventh row units 203, 204 may trail immediately behind the second continuous track 212.

In some embodiments, the first non-treaded area 242 of the first continuous track 212 may be aligned longitudinally (along the travel direction) with the opener implement 136a, the gauge wheel 134a, and the closer implement 138a of the fourth row unit 201. Also, the second non-treaded area 244 may be aligned longitudinally with the opener implement 136b, the gauge wheel 134b, and the closer implement 138b of the fifth row unit 202. The tread area 246 may be aligned longitudinally with an intermediate space 299 defined between the fourth row unit 201 and the fifth row unit 202. The second continuous track 222 may be similarly aligned with respect to the sixth and seventh row units 203, 204.

Accordingly, the gauge wheels 134 of the row units 119 are likely to encounter smooth ground as the vehicle 100 travels across the field. The gauge wheels 134 are less likely to bounce vertically or vibrate during travel. The gauge wheels 134 are thereby better able to maintain the opener and closer implements 136, 138 at the set height such that the row unit 119 is more likely to plant the commodity at a predetermined soil depth.

Furthermore, the non-treaded portions 242, 244 of the tracks 212, 222 may be aligned with the opener and closer implements 136, 138. These implements 136, 138 are, therefore, more likely to encounter minimally compacted ground. Accordingly, the opener implements 136 and the closer implements 138 are better able to move the ground material and ensure proper planting of the commodity.

Also, the following examples are provided, which are numbered for easier reference.

1. A work vehicle configured to travel in a travel direction across a ground surface, the work vehicle comprising: a frame; a row unit that is attached to the frame, the row unit including a gauge wheel and a ground engaging implement, the gauge wheel configured to ride on the ground surface and maintain the ground engaging implement at a predetermined vertical position with respect to the ground surface; and a ground support unit that supports the frame for movement across the ground surface, the ground support unit including an outer face, the outer face including a non-treaded side area that defines a lateral side of the outer face, the outer face including a tread area that is spaced laterally from the lateral edge, the tread area including a plurality of projections, the non-treaded side area aligned along the travel direction with respect to the gauge wheel.

2. The work vehicle of example 1, wherein the ground support unit is a continuous track.

3. The work vehicle of example 2, wherein the non-treaded side area is aligned along the travel direction with respect to the ground engaging implement.

4. The work vehicle of example 3, wherein the row unit is a first row unit with a first gauge wheel and a first ground engaging implement, the first gauge wheel configured to ride on the ground surface and maintain the first ground engaging implement at the predetermined vertical position with respect to the ground surface; further comprising a second row unit with a second gauge wheel and a second ground engaging implement, the second gauge wheel configured to ride on the ground surface and maintain the second ground engaging implement at the predetermined vertical position with respect to the ground surface; further comprising an intermediate space defined laterally between the first and second row units, the continuous track including a first non-treaded side area that defines a first lateral side of the outer face, a second non-treaded side area that defines a second lateral side of the outer face, and the tread area; the tread area being defined between the first and second non-treaded side areas, the tread area including a plurality of treads, the first non-treaded side area aligned along the travel direction with respect to the first gauge wheel and the first ground engaging implement, the second non-treaded side area aligned along the travel direction with respect to the second gauge wheel and the second ground engaging implement, the tread area aligned along the travel direction with respect to the intermediate space.

5. The work vehicle of example 1, wherein the plurality of projections includes a plurality of bar treads that extend at a positive angle relative to the travel direction.

6. The work vehicle of example 1, wherein the ground engaging implement includes an opener implement configured to open a trench as the work vehicle travels across the field; wherein the non-treaded side area is aligned along the travel direction with respect to the gauge wheel and the opener implement.

7. The work vehicle of example 1, wherein the ground engaging implement includes a closer implement configured to close a trench as the work vehicle travels across the field; wherein the non-treaded side area is aligned along the travel direction with respect to the gauge wheel and the closer implement.

8. The work vehicle of example 1, wherein the work vehicle includes a towing package for attaching the work vehicle to a towing vehicle.

9. A work vehicle configured to travel in a travel direction across a ground surface, the work vehicle comprising: a commodity tank configured to contain a commodity; a frame that supports the commodity tank; a delivery system supported by the frame and configured to convey commodity from the commodity tank away from the work vehicle; a row unit attached to the frame and including a gauge wheel and a ground engaging implement, the gauge wheel configured to ride on the ground surface and maintain the ground engaging implement at a predetermined vertical position with respect to the ground surface; and a ground support unit that supports the frame for movement across the ground surface, the ground support unit including an outer face, the outer face including a non-treaded side area that defines a lateral side of the outer face, the outer face including a tread area that is spaced laterally from the lateral edge, the tread area including a plurality of projections, the non-treaded side area aligned along the travel direction with respect to the gauge wheel.

10. The work vehicle of example 9, wherein the ground support unit is a continuous track.

11. The work vehicle of example 10, wherein the non-treaded side area is aligned along the travel direction with respect to the ground engaging implement.

12. The work vehicle of example 12, wherein the row unit is a first row unit with a first gauge wheel and a first ground engaging implement, the first gauge wheel configured to ride on the ground surface and maintain the first ground engaging implement at the predetermined vertical position with respect to the ground surface; further comprising a second row unit with a second gauge wheel and a second ground engaging implement, the second gauge wheel configured to ride on the ground surface and maintain the second ground engaging implement at the predetermined vertical position with respect to the ground surface; further comprising an intermediate space defined laterally between the first and second row units, the continuous track including a first non-treaded side area that defines a first lateral side of the outer face, a second non-treaded side area that defines a second lateral side of the outer face, and the tread area; the tread area being defined between the first and second non-treaded side areas, the tread area including a plurality of treads, the first non-treaded side area aligned along the travel direction with respect to the first gauge wheel and the first ground engaging implement, the second non-treaded side area aligned along the travel direction with respect to the second gauge wheel and the second ground engaging implement, the tread area aligned along the travel direction with respect to the intermediate space.

13. The work vehicle of example 9, wherein the plurality of projections includes a plurality of bar treads that extend at a positive angle relative to the travel direction.

14. The work vehicle of example 9, wherein the ground engaging implement includes at least one of an opener implement configured to open a trench as the work vehicle travels across the field and a closer implement configured to close a trench as the work vehicle travels across the field; wherein the non-treaded side area is aligned along the travel direction with respect to the gauge wheel and the at least one of the opener implement and the closer implement.

15. The work vehicle of example 9, wherein the work vehicle includes a towing package for attaching the work vehicle to a towing vehicle.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A work vehicle configured to travel in a travel direction across a ground surface, the work vehicle comprising:
    a frame;
    a row unit that is attached to the frame, the row unit including a gauge wheel and a ground engaging implement, the gauge wheel configured to ride on the ground surface and maintain the ground engaging implement at a predetermined vertical position with respect to the ground surface; and
    a ground support unit that supports the frame for movement across the ground surface, the ground support unit including a wheel or track having a width and an outer face, the outer face including a non-treaded side area that defines a lateral side of the outer face, the outer face including a tread area that is spaced laterally from the lateral side, the tread area including a plurality of projections that extend outwardly beyond the non-treaded side area, the gauge wheel being arranged behind the ground support unit within the width of the wheel or track in alignment with the non-treaded side area of the outer face along the travel direction such that the gauge wheel does not follow the tread area.

2. The work vehicle of claim 1, wherein the wheel or track of the ground support unit comprises a continuous track having a belt.

3. The work vehicle of claim 1, wherein the non-treaded side area is aligned along the travel direction with respect to the ground engaging implement.

4. The work vehicle of claim 2, wherein the row unit comprises a first row unit, the gauge wheel comprises a first gauge wheel and the ground engaging implement comprises a first ground engaging implement, the first gauge wheel configured to ride on the ground surface and maintain the first ground engaging implement at the predetermined vertical position with respect to the ground surface; and
    wherein the lateral side of the outer face comprises a first lateral side;
    further comprising a second row unit with a second gauge wheel and a second ground engaging implement, the second gauge wheel configured to ride on the ground surface and maintain the second ground engaging implement at the predetermined vertical position with respect to the ground surface;
    further comprising an intermediate space defined laterally between the first and second row units,
    the non-treaded side area of the continuous track including a first non-treaded side area that defines the first lateral side of the outer face and a second non-treaded side area that defines a second lateral side of the outer face;
    the tread area being defined between the first and second non-treaded side areas, the plurality of projections of the tread area including a plurality of treads, the first non-treaded side area aligned along the travel direction with respect to the first gauge wheel and the first ground engaging implement, the second non-treaded side area aligned along the travel direction with respect to the second gauge wheel and the second ground engaging implement, the tread area aligned along the travel direction with respect to the intermediate space.

5. The work vehicle of claim 1, wherein the plurality of projections includes a plurality of bar treads that extend at a positive angle relative to the travel direction.

6. The work vehicle of claim 1, wherein the ground engaging implement includes an opener implement configured to open a trench as the work vehicle travels across the ground surface;
   wherein the non-treaded side area is aligned along the travel direction with respect to the gauge wheel and the opener implement.

7. The work vehicle of claim 1, wherein the ground engaging implement includes a closer implement configured to close a trench as the work vehicle travels across the ground surface;
   wherein the non-treaded side area is aligned along the travel direction with respect to the gauge wheel and the closer implement.

8. The work vehicle of claim 1, wherein the ground engaging implement includes an opener implement configured to open a trench and a closer implement configured to close the trench as the work vehicle travels across the ground surface; and
   wherein the non-treaded side area is aligned along the travel direction with respect to the gauge wheel, the opener implement, and the closer implement.

9. The work vehicle of claim 1, wherein the work vehicle includes a towing package for attaching the work vehicle to a towing vehicle.

10. A work vehicle configured to travel in a travel direction across a ground surface, the work vehicle comprising:
   a commodity tank configured to contain a commodity;
   a frame that supports the commodity tank;
   a delivery system supported by the frame and configured to convey commodity from the commodity tank away from the work vehicle;
   a row unit attached to the frame and including a gauge wheel and a ground engaging implement, the gauge wheel configured to ride on the ground surface and maintain the ground engaging implement at a predetermined vertical position with respect to the ground surface; and
   a ground support unit that supports the frame for movement across the ground surface, the ground support unit including a wheel or track having a width and an outer face, the outer face including a non-treaded side area that defines a lateral side of the outer face, the outer face including a tread area that is spaced laterally from the lateral side, the tread area including a plurality of projections that extend outwardly beyond the non-treaded side area, the gauge wheel being arranged behind the ground support unit within the width of the wheel or track in alignment with the non-treaded side area of the outer face along the travel direction such that the gauge wheel does not follow the tread area.

11. The work vehicle of claim 10, wherein the wheel or track of the ground support unit comprises a continuous track having a belt.

12. The work vehicle of claim 10, wherein the non-treaded side area is aligned along the travel direction with respect to the ground engaging implement.

13. The work vehicle of claim 11, wherein the row unit comprises a first row unit, the gauge wheel comprises a first gauge wheel and the ground engaging implement comprises a first ground engaging implement, the first gauge wheel configured to ride on the ground surface and maintain the first ground engaging implement at the predetermined vertical position with respect to the ground surface; and
   wherein the lateral side of the outer face comprises a first lateral side;
   further comprising a second row unit with a second gauge wheel and a second ground engaging implement, the second gauge wheel configured to ride on the ground surface and maintain the second ground engaging implement at the predetermined vertical position with respect to the ground surface;
   further comprising an intermediate space defined laterally between the first and second row units,
   the non-treaded side area of the continuous track including a first non-treaded side area that defines the first lateral side of the outer face and a second non-treaded side area that defines a second lateral side of the outer face;
   the tread area being defined between the first and second non-treaded side areas, the plurality of projections of the tread area including a plurality of treads, the first non-treaded side area aligned along the travel direction with respect to the first gauge wheel and the first ground engaging implement, the second non-treaded side area aligned along the travel direction with respect to the second gauge wheel and the second ground engaging implement, the tread area aligned along the travel direction with respect to the intermediate space.

14. The work vehicle of claim 10, wherein the plurality of projections includes a plurality of bar treads that extend at a positive angle relative to the travel direction.

15. The work vehicle of claim 10, wherein the ground engaging implement includes an opener implement configured to open a trench as the work vehicle travels across the ground surface;
   wherein the non-treaded side area is aligned along the travel direction with respect to the gauge wheel and the opener implement.

16. The work vehicle of claim 10, wherein the ground engaging implement includes a closer implement configured to close a trench as the work vehicle travels across the ground surface;
   wherein the non-treaded side area is aligned along the travel direction with respect to the gauge wheel and the closer implement.

17. The work vehicle of claim 10, wherein the ground engaging implement includes an opener implement configured to open a trench and a closer implement configured to close the trench as the work vehicle travels across the ground surface; and
   wherein the non-treaded side area is aligned along the travel direction with respect to the gauge wheel, the opener implement, and the closer implement.

18. The work vehicle of claim 10, wherein the work vehicle includes a towing package for attaching the work vehicle to a towing vehicle.

19. A work vehicle configured to travel in a travel direction across a ground surface, the work vehicle comprising:
   a frame;
   a plurality of row units that are attached to the frame, the plurality of row units including a first row unit and a second row unit, the first row unit neighboring the second row unit with an intermediate space defined laterally between the first and second row units, the first row unit including a first gauge wheel and a first ground engaging implement, the second row unit including a second gauge wheel and a second ground engaging implement; and
   a ground support unit that supports the frame for movement across the ground surface, the ground support unit including a continuous track comprised of a belt having a width, the continuous track including a first non-treaded side area that defines a first lateral side of the continuous track, a second non-treaded side area that defines a second lateral side of the continuous track, and a tread area that is defined between the first and second non-treaded side areas, the tread area including a plurality of treads that extend outwardly beyond the first and second non-treaded side areas, the first gauge wheel and the first ground engaging implement being arranged behind the ground support unit within the width of the continuous track in alignment with the first non-treaded side area along the travel direction such that the first gauge wheel does not follow the tread area, the second gauge wheel and the second ground engaging implement being arranged behind the ground support unit within the width of the continuous track in alignment with the second non-treaded side area along the travel direction such that the second gauge wheel does not follow the tread area, the tread intermediate area being aligned laterally with the intermediate space along the travel direction.

20. The work vehicle of claim 19, wherein the first ground engaging implement includes a first opener implement and a first closer implement;
    wherein the second ground engaging implement includes a second opener implement and a second closer implement;
    wherein the first non-treaded side area is aligned laterally with the first gauge wheel, the first opener implement, and the first closer implement along the travel direction; and
wherein the second non-treaded side area is aligned laterally with the second gauge wheel, the second opener implement, and the second closer implement along the travel direction.

\* \* \* \* \*